United States Patent
Chiu et al.

(10) Patent No.: US 7,158,302 B2
(45) Date of Patent: Jan. 2, 2007

(54) WIRE GRID POLARIZER WITH DOUBLE METAL LAYERS

(75) Inventors: Chih-Ho Chiu, Taipei (TW); Hui-Lung Kuo, Taipei (TW); Yi-Chun Liu, Taoyuan (TW); Ping-Chen Chen, Taipei (TW)

(73) Assignee: Industry Technology Research Institute, Hsinchu (TW)

( * ) Notice: Subject to any disclaimer, the term of this patent is extended or adjusted under 35 U.S.C. 154(b) by 0 days.

(21) Appl. No.: 10/820,421

(22) Filed: Apr. 8, 2004

(65) Prior Publication Data

US 2005/0088739 A1 Apr. 28, 2005

(30) Foreign Application Priority Data

Oct. 23, 2003 (TW) ............... 92129398 A

(51) Int. Cl.
*G02B 27/28* (2006.01)
(52) U.S. Cl. .................... 359/486; 359/576
(58) Field of Classification Search .......... 359/486, 359/572, 576
See application file for complete search history.

(56) References Cited

U.S. PATENT DOCUMENTS

| 4,289,381 | A | * | 9/1981 | Garvin et al. | 427/163.1 |
| 6,122,103 | A | * | 9/2000 | Perkins et al. | 359/486 |
| 6,251,297 | B1 | * | 6/2001 | Komuro et al. | 216/24 |
| 2002/0024735 | A1 | * | 2/2002 | Kleemann et al. | 359/572 |
| 2004/0201889 | A1 | * | 10/2004 | Wang et al. | 359/486 |

FOREIGN PATENT DOCUMENTS

JP 2003066229 A * 3/2003

OTHER PUBLICATIONS

Zhaoning Yu, et al., "Reflective polarizer based on a stacked double-layer subwavelength metal grating structure frabircated using nanoimprint lithography", Appl. Phys. Let.., vol. 77, No. 7, pp. 927-929, Aug. 14, 2000.*

Zhaoning Yu, et al., "Novel reflection polarizers with double-layer subwavelength metal grating structure", Conf. on Lasers & Electro-Optics, 1999, CLEO '99, Summaries of papers presented at conf. on, pp. 420-421 (CThK36), May 1999.*

J.J. Kuta, et al. "Coupled-wave analysis of lamellar metal transmission gratings for the visible and the infrared", J. Opt. Soc. Am. A, vol. 12, No. 5, pp. 1118-1127, May 1995.*

* cited by examiner

*Primary Examiner*—Mark A. Robinson
*Assistant Examiner*—Lee Fineman
(74) *Attorney, Agent, or Firm*—Thomas, Kayden, Horstemeyer & Risley

(57) ABSTRACT

A wire grid polarizer with double metal layers for the visible spectrum. Parallel dielectric layers having a period (p) of 10~250 nm and a trench between adjacent dielectric layers overlie a transparent substrate. A first metal layer having a first thickness (d1) of 30~150 nm is disposed in the trench. A second metal layer having a second thickness (d2) of 30~150 nm and a width (w) overlies on the top surface of each dielectric layer. The first and second metal layers are separated by a vertical distance (l) of 10~100 nm. The first thickness (d1) is the same as the second thickness (d2). A ratio of the width (w) to the period (p) is 25~75%.

28 Claims, 14 Drawing Sheets

WIRE GRID POLARIZER WITH DOUBLE METAL LAYERS

BACKGROUND OF THE INVENTION

1. Field of the Invention

The present invention relates to a polarizer which provides a very high extinction ratio (>1000), and more particularly, to a wire grid polarizer with double metal layers for use in visible spectrum and a fabrication method thereof.

2. Description of the Related Art

The use of an array of parallel conducting wires to polarize radio waves dates back more than 110 years. Wire grids, generally in the form of an array of thin parallel conductors supported by a transparent substrate, have also been used as polarizers for the electromagnetic spectrum.

FIG. 1 illustrates a conventional wire grid polarizer. The wire grid polarizer 100 comprises a multiplicity of parallel conductive electrodes 110 supported by a dielectric substrate 120. This device is characterized by the grating spacing or pitch or period of the conductors 110, designated as P; the width of the individual conductors 110, designated as W; and the thickness of the conductors 110, designated as D. A beam of light 130 produced by a light source 132 is incident on the polarizer at an angle θ from normal, with the plane of incidence orthogonal to the conductive electrodes 110. The wire grid polarizer 100 divides this beam 130 into a specularly reflected light beam 140 and a non-diffracted, transmitted light beam 150. The incident light 130 comprises TM and TE (Transverse Magnetic and Electric) polarized light. The TM polarized light is also referred to as a P polarized light and the TE polarized as an S polarized light. Using the normal definitions for the TM and TE polarized light; the TM polarized light has an electric field vector perpendicular to the wires 110 of the grid. Conversely, the TE polarized light has an electric field vector parallel to the wires 110 of the grid. In general, a wire grid polarizer will reflect the TE polarized light and transmit the TM polarized light. The polarization performance is determined by an extinction ratio of transmittance (i.e. $T_{TM}/T_{TE}$), wherein the symbol "$T_{TM}$" is the transmittance of the TM polarized light and the symbol "$T_{TE}$" is the transmittance of the TE polarized light. For simplicity, the extinction ratio of transmittance is referred to as the extinction ratio in this invention.

In U.S. Pat. No. 4,289,381, Garvin et al disclose a high selectivity thin film polarizer with double metal layers. The thin film polarizer is manufactured by traditional photolithography and etching processes. Nevertheless, the device is described relative to usage in the infrared spectrum (2~100 μm), not the visible spectrum. That is, the reference does not teach how to design the polarizer with high quality extinction for the visible spectrum.

In U.S. Pat. No. 5,748,368, Tamada et al disclose a polarizer with single metal layer. The device has a specific ratio of wire length to width, grid spacing and trapezoidal wire shape. Nevertheless, the device provides a very low extinction ratio (about 30:1). Furthermore, the device only operates properly within narrow wavelength bands (about 25 nm) and the device is rather angularly sensitive. These considerations make the device unsuitable for broad wavelength bands in the visible spectrum.

In U.S. Pat. No. 6,122,103, Perkins et al disclose a broadband wire grid polarizer for the visible spectrum. The method changes the refractive index of the dielectric layer and etches slots into the substrate to form ribs, thereby increasing the polarization range of this device.

In U.S. patent application Ser. No. 2002/0122235, Kurtz et al disclose a wire grid polarizer. This device employs intra-wires of dielectric and metal to enhance the extinction ratio. The device is difficult to manufacture, however, as it requires at least six intra-wire layers.

In U.S. patent application Ser. No. 2002/0191286, Gale et al disclose a method of forming a polarizer with a continuous-relief profile. Nevertheless, the extinction ratio of this device is unstable. For example, the extinction ratio is about 20:1 when using a light wavelength of 550 nm.

Thus, there exists a need for an improved wire grid polarizer with very high extinction ratio (>1000), particularly for use in visible light systems. Moreover, there is a need for an improved wire grid polarizer for use at large incident angles, for example, for use in a LCD having a light source disposed at the lateral thereof.

SUMMARY OF THE INVENTION

The object of the present invention is to provide a polarizer with a very high extinction ratio (>1000).

Another object of the present invention is to provide a wire grid polarizer with double metal layers for use in the visible spectrum and a fabrication method thereof.

In order to achieve these objects, the present invention provides a wire grid polarizer with double metal layers for the visible spectrum. Parallel dielectric layers having a period (p) of 10~250 nm and a trench between adjacent dielectric layers overlie a transparent substrate. A first metal layer having a first thickness (d1) of 30~150 nm is disposed in the trench. A second metal layer having a second thickness (d2) of 30~150 nm and a width (w) overlies on the dielectric layers. A vertical distance (l) between the first and second metal layers is 10~100 nm. The first thickness (d1) is the same as the second thickness (d2). A ratio of the width (w) to the period (p) is 25~75%.

In order to achieve these objects, the present invention also provides a method of forming a wire grid polarizer with double metal layers for the visible spectrum. A transparent substrate is provided. An array of parallel and elongated dielectric layers is formed on the transparent substrate by photolithography and nanoimprint, wherein the dielectric layers have a period and a trench is formed between adjacent dielectric layers. A first metal layer having a first thickness is formed in the trench. A second metal layer having a second thickness and a width is formed on each dielectric layer. The first and second metal layers are separated by a vertical distance. The period is in a range of 10~250 nm. The first thickness is in a range of 30~150 nm and is equal to the second thickness. The vertical distance is in a range of 10~100 nm. The ratio of the width to the period is in a range of 25~75%.

The present invention improves on the conventional technology in that the wire grid polarizer with double metal layers has the period of 10~250 nm, the first or second thickness of 30~150 nm, and the vertical distance of 10~100 nm. Additionally, the ratio of the width to the period is 25~75%. Thus, the polarizer according to the present invention can reduce resonance to achieve the high extinction ratio (>1000) for the visible spectrum. Furthermore, the polarizer maintains a high extinction ratio for use at large incident angles. Thus, it is useful for LCD applications and ameliorates the disadvantages of the conventional technology.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

With reference to the drawings, preferred embodiments of the invention are described below.

First Embodiment

Figure 2:
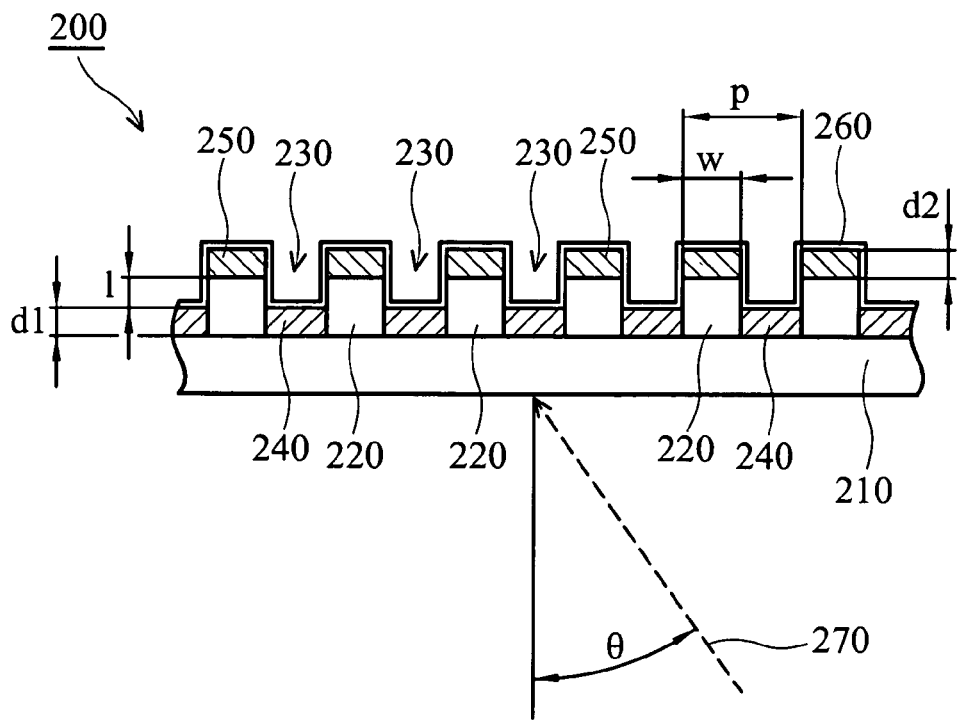
FIG. 2 is a sectional view of a wire grid polarizer with double metal layers, according to the first embodiment of the present invention.

FIG. 2 is a sectional view of a wire grid polarizer 200 with double metal layers, according to the first embodiment of the present invention. The wire grid polarizer 200 comprises the following elements.

An insulating and transparent substrate 210 is provided. The transparent substrate 210 can be a glass or plastic substrate, wherein the plastic material is PC (polycarbonate), PMMA (polymethyl methacrylate), PS (polystyrene) or the like. The width of the transparent substrate 210 can be 500~1500 μm. The refractive index (R.I.) of the transparent substrate 210 is, for example, about 1.5.

An array of parallel and elongated dielectric layer 220 overlies the transparent substrate 210, wherein the dielectric layer 220 have a period (p) and a trench 230 is located between adjacent dielectric layers 220. In the first embodiment, the transparent substrate 210 is exposed in the trench 230. The material of the dielectric layers 220 can be polymer, such as PMMA serving as photoresist. Other suitable material such as UV-curable polymers and sol-gel materials can also be used.

A first metal layer 240 having a first thickness (d1) overlies the transparent substrate 210 in the trench 230. The first metal layer 240 is an Au, Ag, Cu or Al layer.

A second metal layer 250 having a second thickness (d2) and a width (w) overlies the top surface of each dielectric layer 220. The first metal layer 240 does not directly connect to the second metal layer 250. That is, the first and second metal layers 240 and 250 are separated by a vertical distance (l). The second metal layer 250 is an Au, Ag, Cu or Al layer. Noted that the material of the first and second metal layers 240 and 250 can be the same or different.

In addition, a conformal protective layer 260 overlies the surface of the first and second metal layers 240 and 250, thereby preventing metal from oxidation. The protective layer 260 can be a $SiO_2$, SiN or SiON layer. Depending on the different fabrication requirements, the protective layer 260 serving as a planarization layer (not shown) can thoroughly cover the entire device.

The dimensions of the above elements and the dimensions of the arrangement of the elements are tailored for broad or full visible light spectrum. Specific dimensions are given below. The period (p) is not greater than 250 nm, for example, in a range of 10~250 nm. The first thickness (d1) is not greater than 150 nm, for example, in a range of 30~150 nm. In addition, the first thickness (d1) is equal to the second thickness (d2). The vertical distance (l) is not greater than 100 nm, for example, in a range of 10~100 nm. The ratio of the width (w) to the period (p) is in a range of 25~75%.

In FIG. 2, numeral 270 designates an incident beam, such as a visible light (i.e. wavelength band is about 400~700 nm). The beam 270 is incident on the polarizer 200 at an angle θ from normal, with the plane of incidence orthogonal to the backside of the transparent substrate 210.

According to the first embodiment of the present invention, the polarizer 200 can provide a high extinction ratio (i.e. $T_{TM}/T_{TE}$) of greater than 1000 when used over a wide range of incidence angles θ of 0~80°.

Second Embodiment

Figure 3:
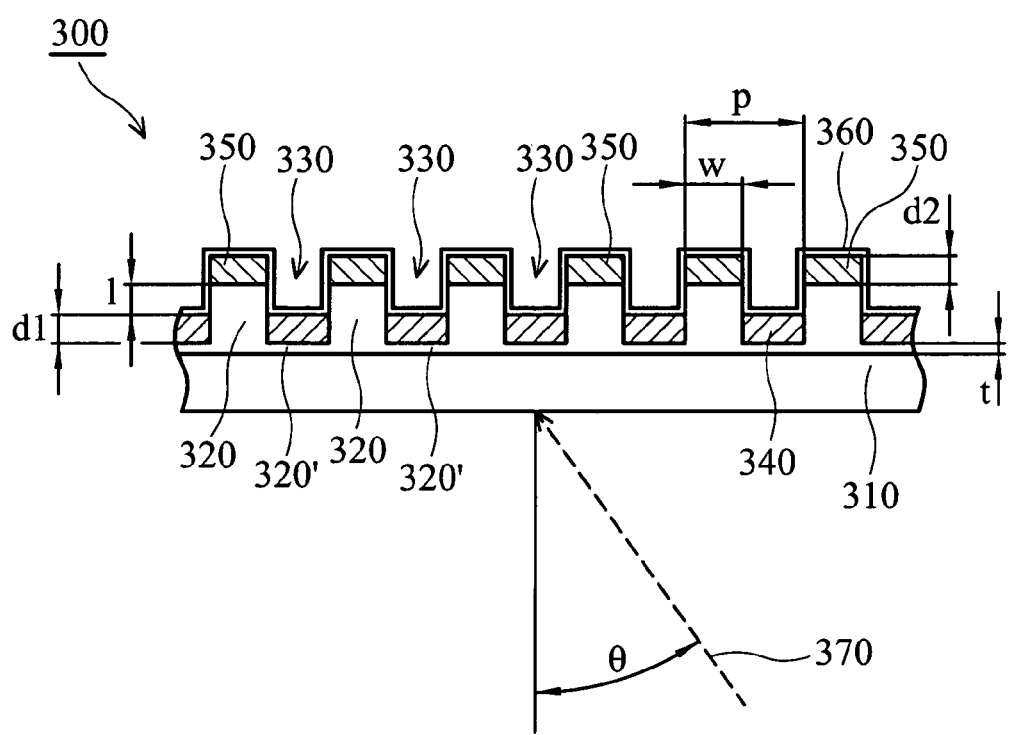
FIG. 3 is a sectional view of a wire grid polarizer with double metal layers, according to the second embodiment of the present invention.

FIG. 3 is a sectional view of a wire grid polarizer 300 with double metal layers, according to the second embodiment of the present invention. The difference in the second embodiment is that the trench does not expose the transparent substrate. That is, a remaining dielectric layer is left in the trench. The wire grid polarizer 300 comprises the following elements.

An insulating and transparent substrate 310 is provided. The transparent substrate 310 can be a glass or plastic substrate, wherein the plastic material is PC (polycarbonate), PMMA (polymethyl methacrylate), PS (polystyrene) or the like. The width of the transparent substrate 310 can be 500~1500 μm. The refractive index (R.I.) of the transparent substrate 310 is about 1.5.

An array of parallel and elongated dielectric layers 320 overlies the transparent substrate 310, wherein the dielectric layers 310 have a period (p) and a trench 330 is located between adjacent dielectric layers 320. In the second embodiment, the transparent substrate 310 is not exposed in the trench 330. That is, a remaining dielectric layer 320' with a thickness "t" is left on the bottom surface of the trench 330. The material of the dielectric layers 320 and 320' can be polymer, such as PMMA serving as photoresist. Other suitable materials such as UV-curable polymers and sol-gel materials can also be used.

A first metal layer 340 having a first thickness (d1) overlies the remaining dielectric layer 320' in the trench 330. The first metal layer 340 can be an Au, Ag, Cu or Al layer.

A second metal layer 350 having a second thickness (d2) and a width (w) overlies the top surface of each dielectric layer 320. The first metal layer 340 does not directly connect to the second metal layer 350. That is, the first and second metal layers 340 and 350 are separated by a vertical distance (l). The second metal layer 350 can be an Au, Ag, Cu or Al layer. Noted that the materials of the first and second metal layers 340 and 350 can be the same or different.

In addition, a conformal protective layer 360 overlies the surface of the first and second metal layers 340 and 350, thereby preventing metal from oxidation. The protective layer 360 can be a $SiO_2$, SiN or SiON layer. Depending on different fabrication requirements, the protective layer 360 serving as a planarization layer (not shown) can thoroughly cover the entire device.

The dimensions of the above elements and the dimensions of the arrangement of the elements are tailored for the broad or full visible light spectrum. Specific dimensions are given below. The period (p) is not greater than 250 nm, for example, in a range of 10~250 nm. The first thickness (d1) is not greater than 150 nm, for example, in a range of 30~150 nm. In addition, the first thickness (d1) is equal to the second thickness (d2). The vertical distance (l) is not greater than 100 nm, for example, in a range of 10~100 nm. The ratio of the width (w) to the period (p) is in a range of 25~75%.

In FIG. 3, numeral 370 designates an incident beam, such as a visible light (i.e. wavelength band is about 400~700 nm) The beam 370 is incident on the polarizer 300 at an angle θ from normal, with the plane of incidence orthogonal to the backside of the transparent substrate 310.

According to the second embodiment of the present invention, the polarizer 300 can provide a high extinction ratio (i.e. $T_{TM}/T_{TE}$) of greater than 1000 when used over a wide range of incidence angles θ of 0~80°.

Figure 4A:
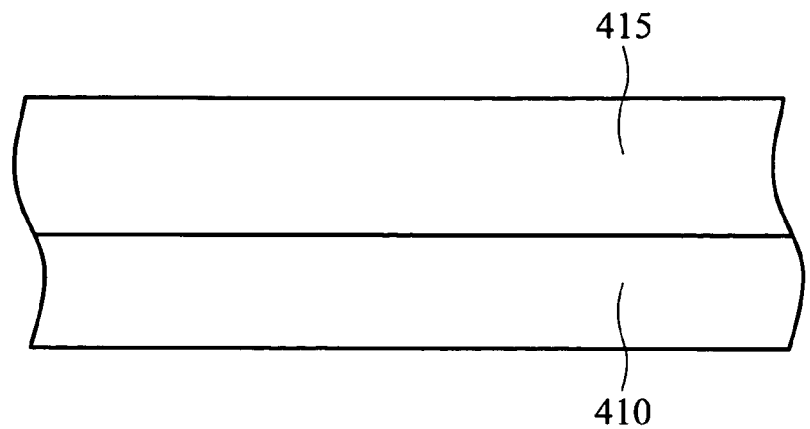
FIGS. 4A~4C are sectional views illustrating a method of forming the wire grid polarizers according to the present invention.
Figure 4B:
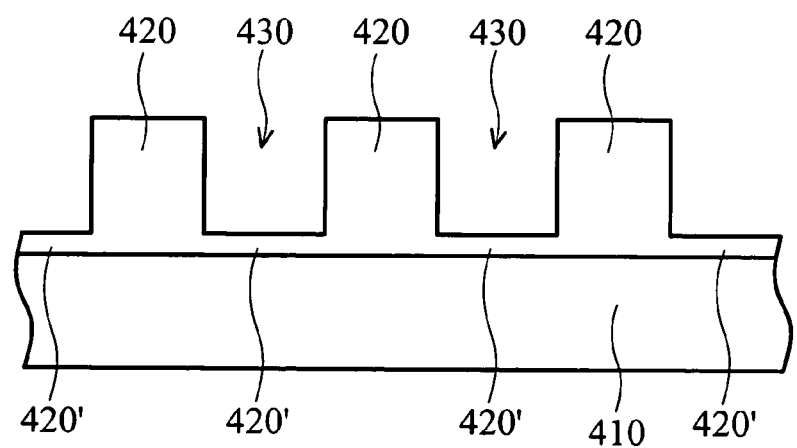
Figure 4C:
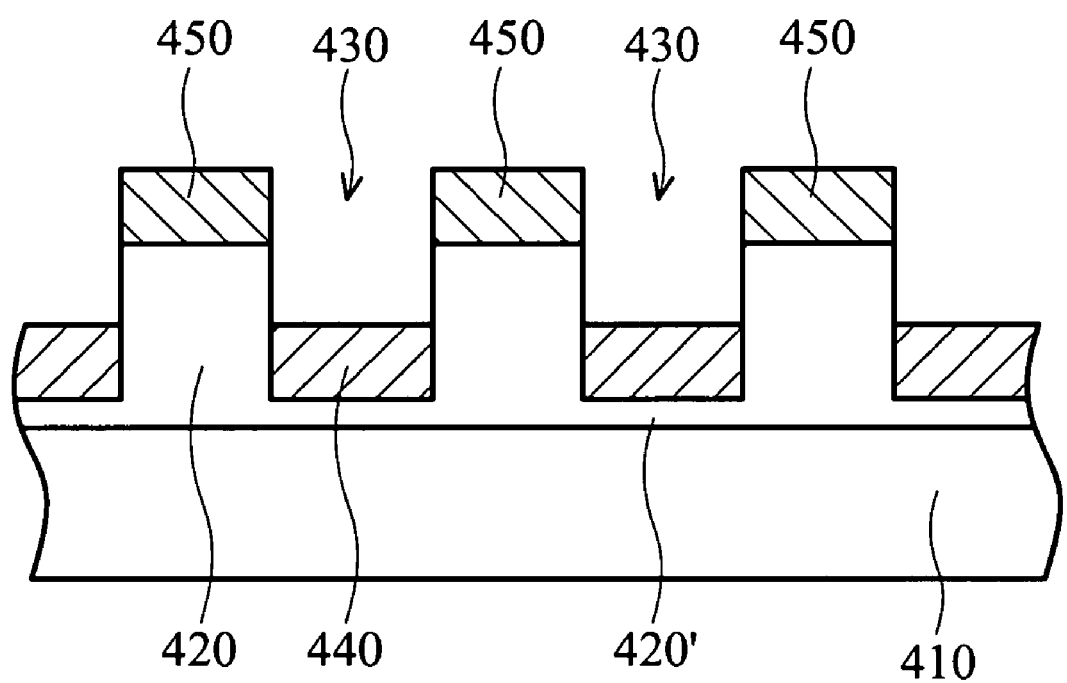

The present invention also provides two methods for fabricating the above polarizers 200 and 300. FIGS. 4A~4C are sectional views illustrating a method for forming the polarizer 200 or 300 according to the present invention.

In FIG. 4A, at least one dielectric layer 415 (such as a PMMA layer serving as a photoresist layer) is coated on a transparent substrate 410.

In FIG. 4B, the dielectric layer 415 is patterned to form a plurality of parallel and elongated dielectric layers 420 with a period on the transparent substrate 410 by photolithography; meanwhile, a trench 430 is formed between adjacent dielectric layers 420. In FIG. 4B, a remaining dielectric layer 420' is left in the bottom of the trench 430 subsequent to this step. Nevertheless, the remaining dielectric layer 420' can be thoroughly removed to expose the transparent substrate 410 in the trench 430. The remaining dielectric layer 420' does not affect the extinction ratio of the polarizers 200 and 300.

In FIG. 4C, by using vacuum evaporation or sputtering, the first metal layer 440 is deposited in the trench 430, while, the second metal layer 450 is simultaneously deposited on the top surface of the dielectric layers 420. It is noted that the first metal layer 440 is not connected to the second metal layer 450. Moreover, a protective layer (not shown) can be formed on the first and second metal layers 440 and 450 by CVD (chemical vapor deposition).

FIGS. 5A~5D are sectional views illustrating another method of forming the polarizer 200 or 300 according to the present invention.

Figure 5A:
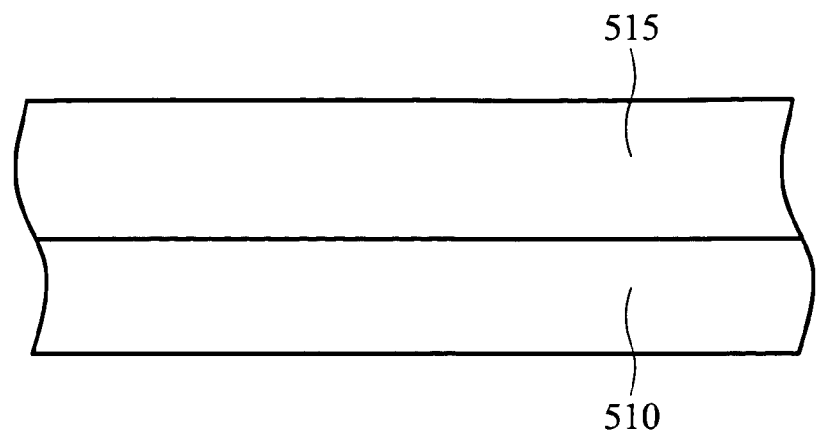
FIGS. 5A~5D are sectional views illustrating another method of forming the wire grid polarizers according to the present invention.

In FIG. 5A, at least one dielectric layer 515 (such as a PMMA layer serving as a photoresist layer) is coated on a transparent substrate 510.

Figure 5B:
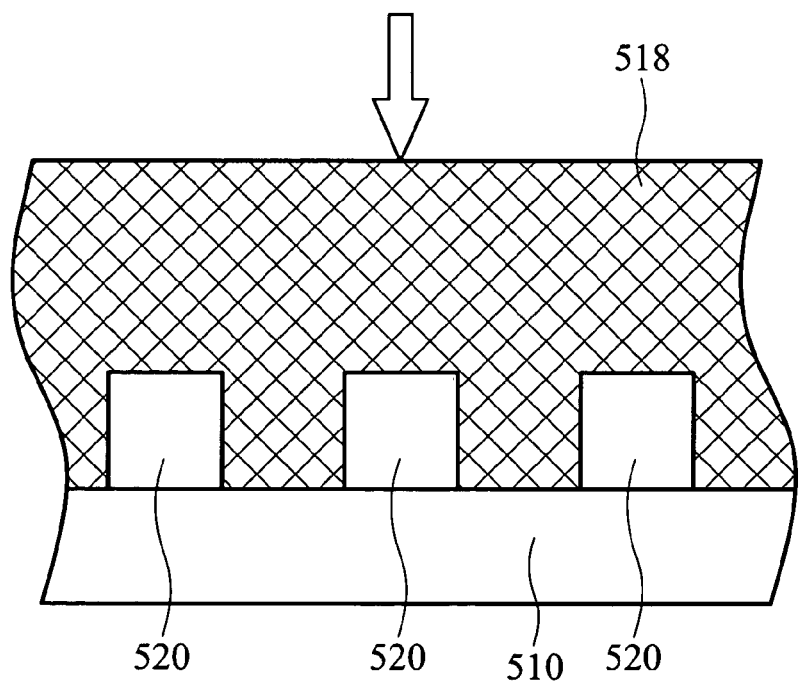
Figure 5C:
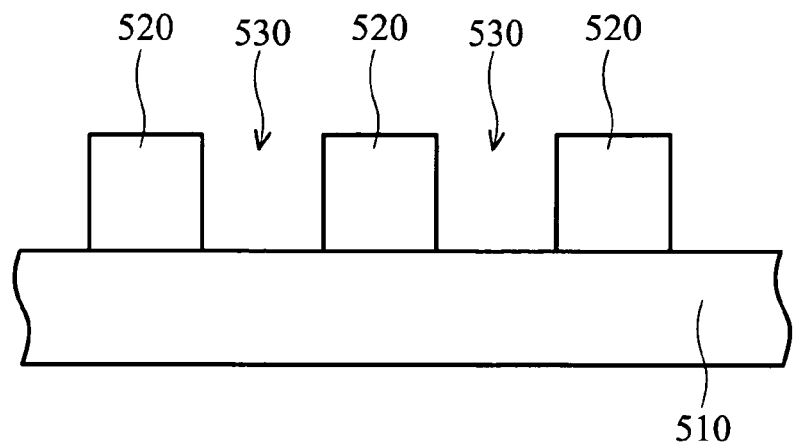

FIG. 5B illustrates a nanoimprint technology employed in forming the polarizer. A mold 518 having a pattern of strip lines thereon is impressed into the dielectric layer 515 by hot embossing or UV casting. The pattern of strip lines is thus transferred to the dielectric layer 515, thereby creating a plurality of parallel and elongated dielectric layers 520 on the transparent substrate 510. Then, referring to FIG. 5C, the mold 518 is removed. At this time, a trench 530 is formed between adjacent dielectric layers 520. In addition, a remaining dielectric layer (not shown) may be left in the trench 530. The remaining dielectric layer (not shown) does not affect the extinction ratio of the polarizers 200 and 300. Nevertheless, referring to FIG. 5C, the remaining dielectric layer (not shown) can also be thoroughly removed to expose the transparent substrate 510 in the trench 530 after RIE (reactive ion etching).

Figure 5D:
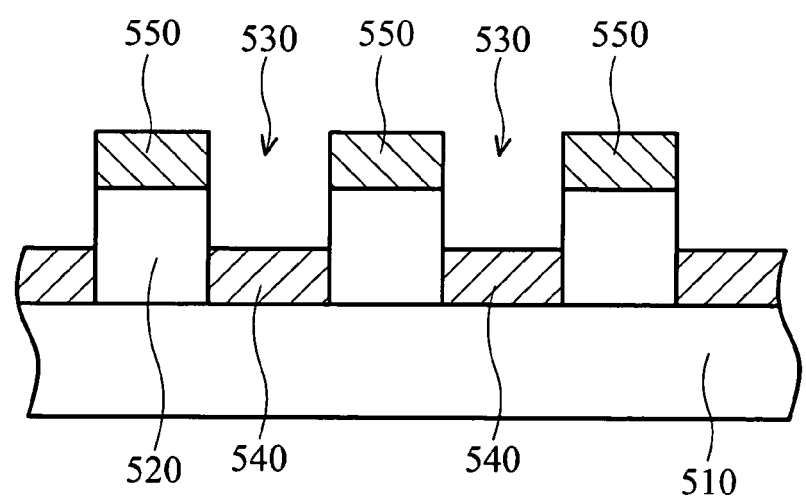

In FIG. 5D, by using vacuum evaporation or sputtering, the first metal layer 540 is deposited in the trench 530, and simultaneously, the second metal layer 550 is deposited on the top surface of the dielectric layers 520. It is noted that the first metal layer 540 is not connected to the second metal layer 550. Moreover, a protective layer (not shown) can be formed on the first and second metal layers 540 and 550 by CVD.

Figure 7A:
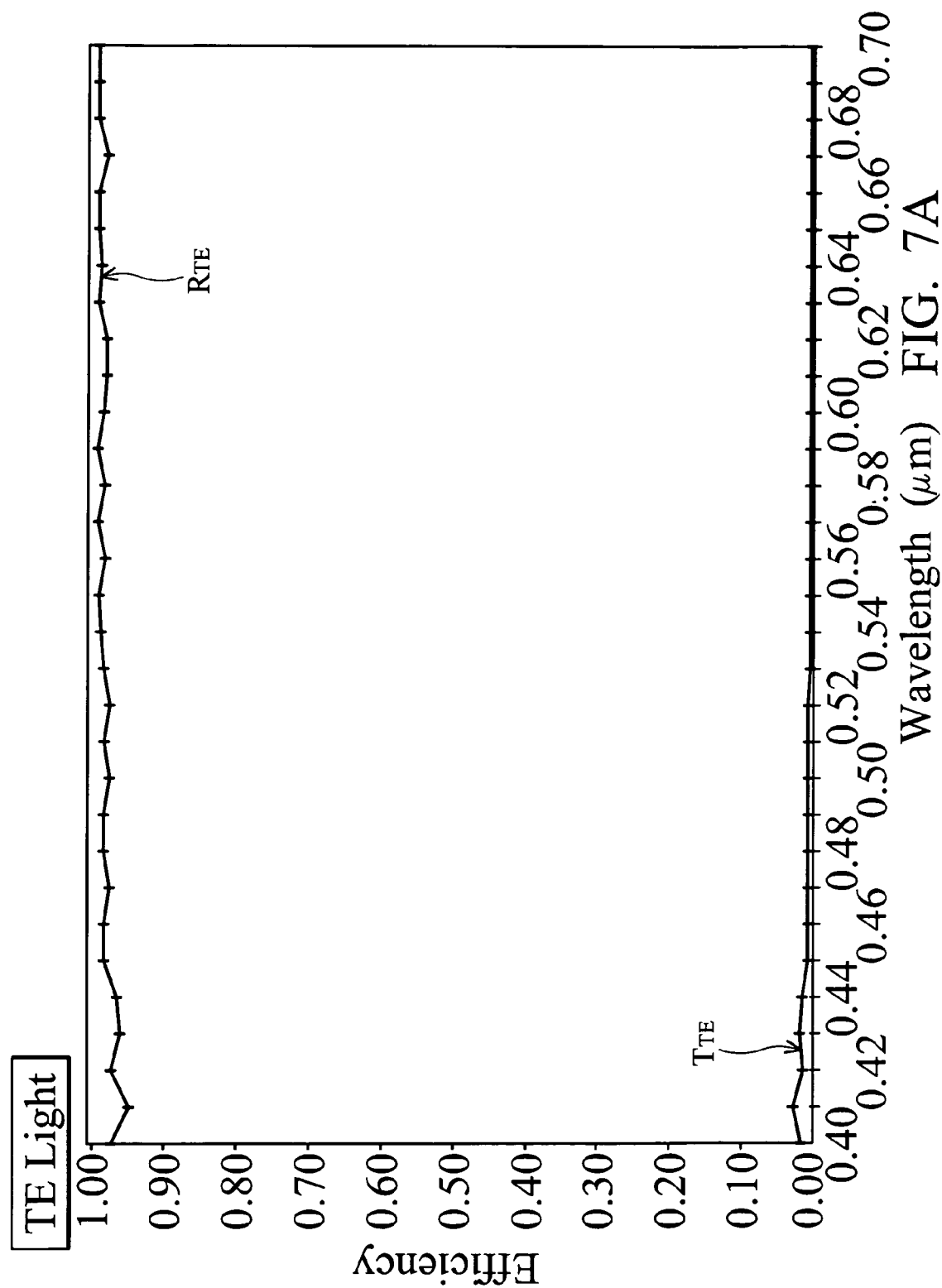
FIG. 7A is a graphical plot showing the relationship between wavelength and reflectance ($R_{TE}$) and transmittance ($T_{TE}$) for TE polarized light of the third test of the wire grid polarizer according to the present invention.
Figure 7B:
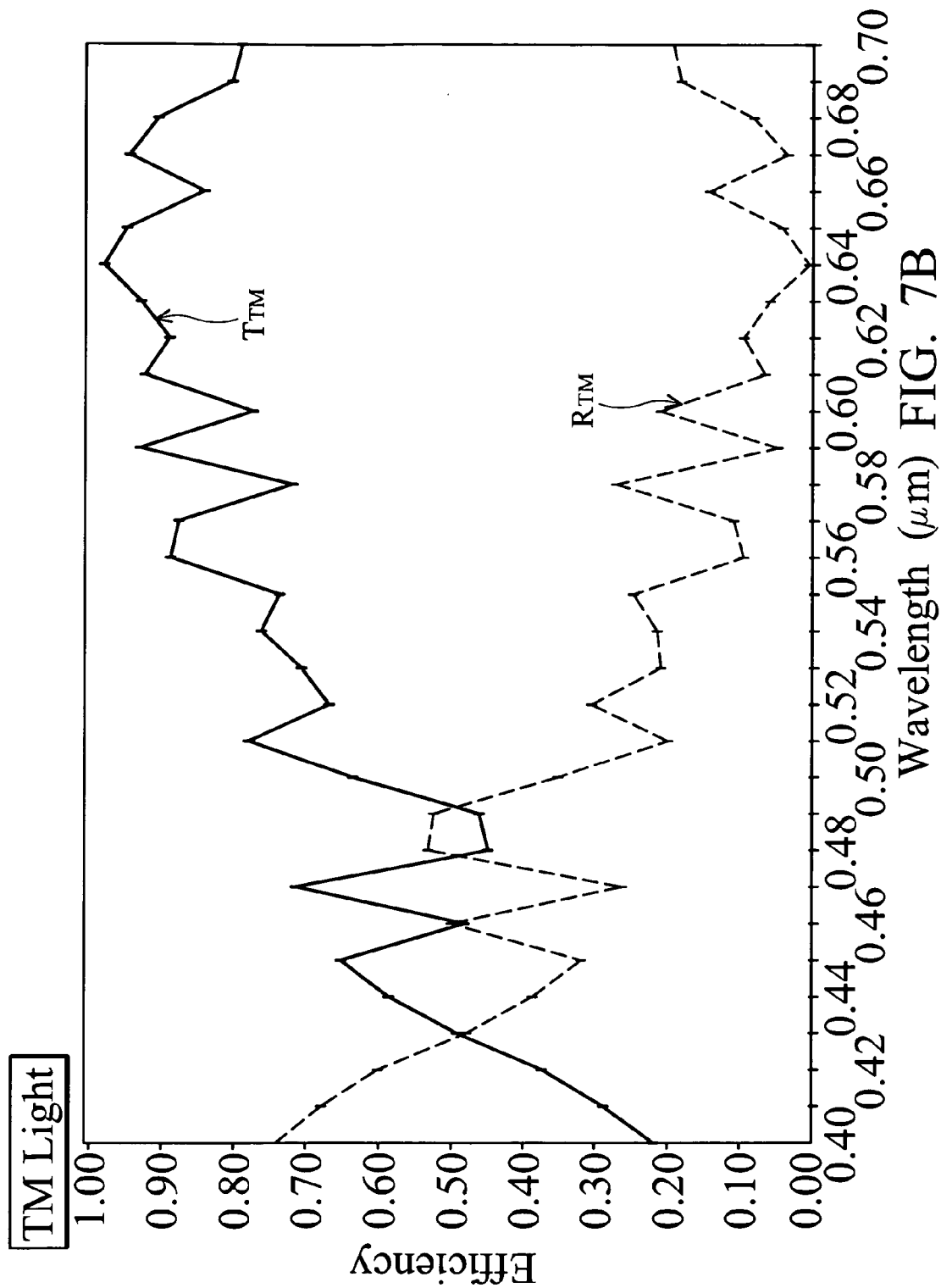
FIG. 7B is a graphical plot showing the relationship between wavelength and reflectance ($R_{TM}$) and transmittance ($T_{TM}$) for TM polarized light of the third test of the wire grid polarizer according to the present invention.
Figure 8A:
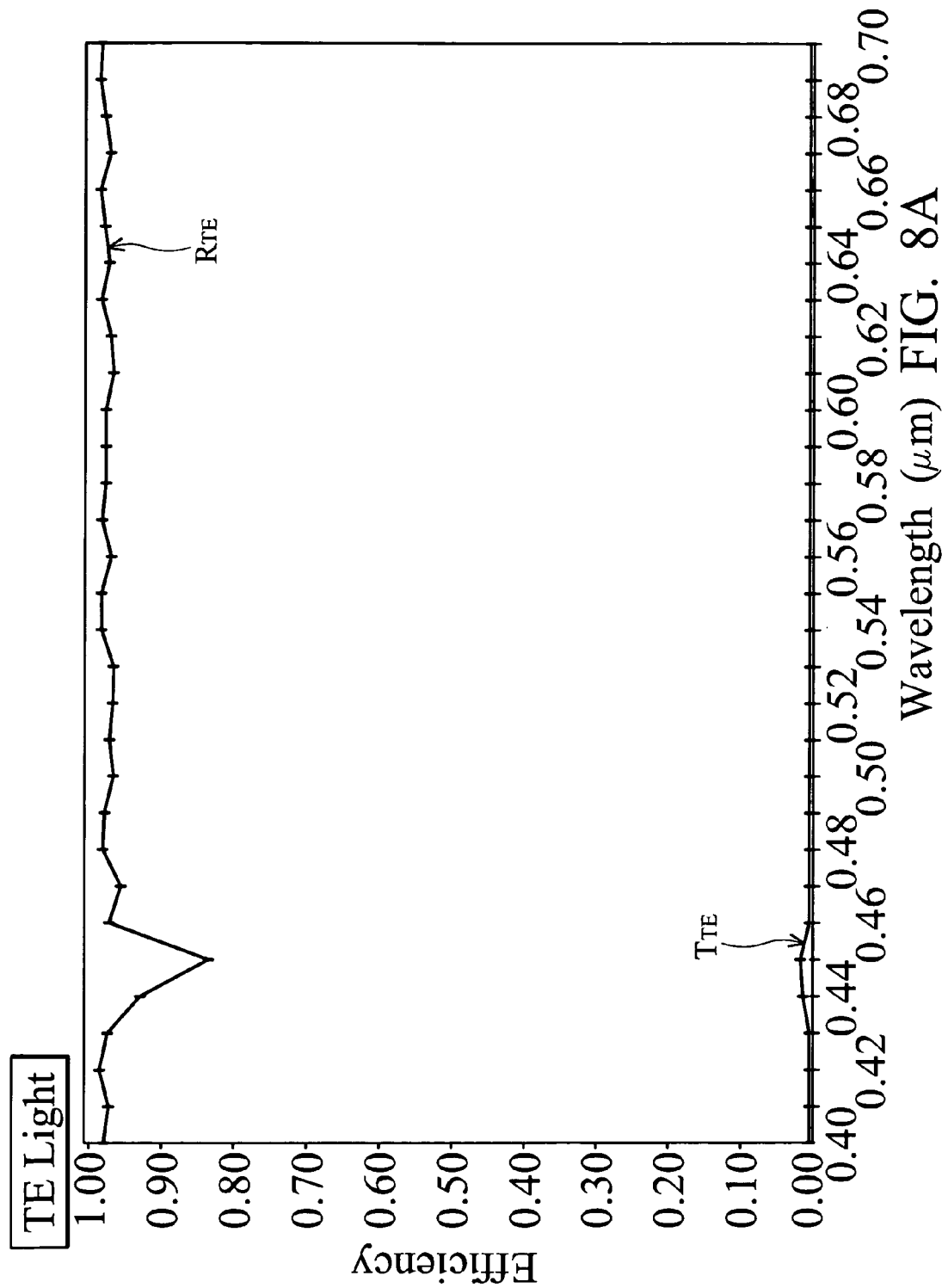
FIG. 8A is a graphical plot showing the relationship between wavelength and reflectance ($R_{TE}$) and transmittance ($T_{TE}$) for TE polarized light of the comparable (or fourth) test of the wire grid polarizer according to the present invention.
Figure 8B:
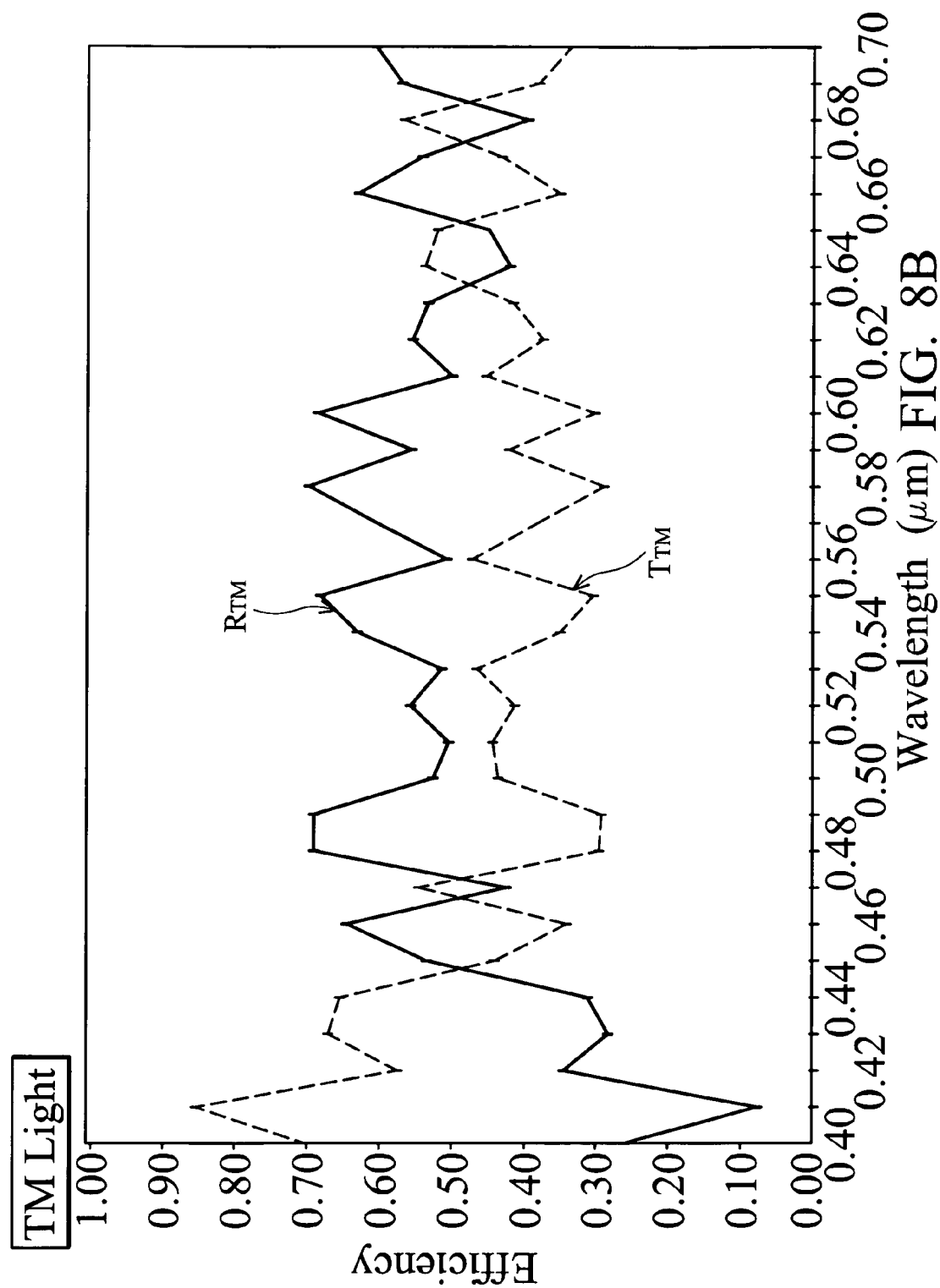
FIG. 8B is a graphical plot showing the relationship between wavelength and reflectance ($R_{TM}$) and transmittance ($T_{TM}$) for TM polarized light of the comparable (fourth) test of the wire grid polarizer according to the present invention.
Figure 9A:
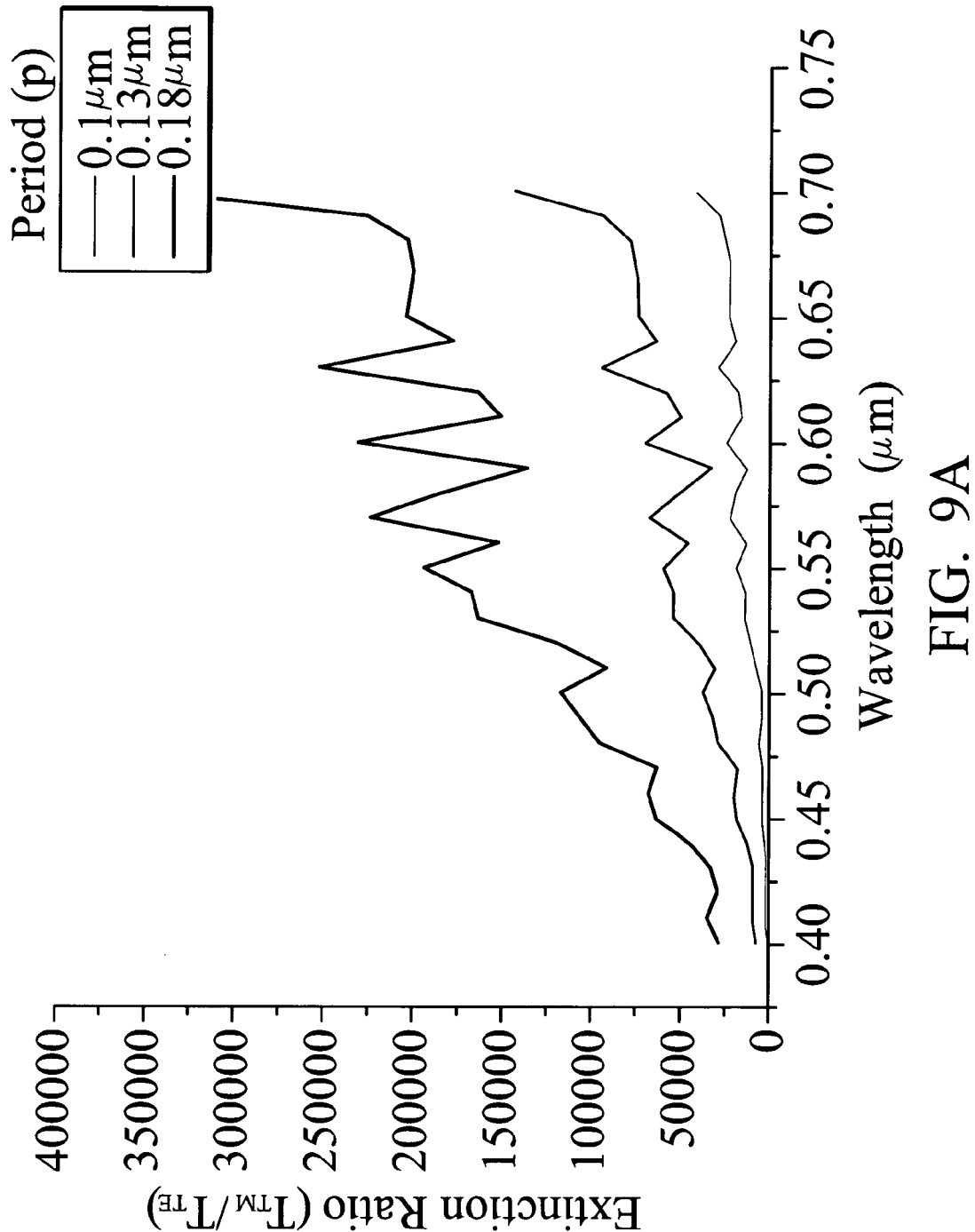
FIG. 9A is a graphical plot showing the relationship between wavelength and extinction ratio of the sixth test of the wire grid polarizer according the present invention.
Figure 9B:
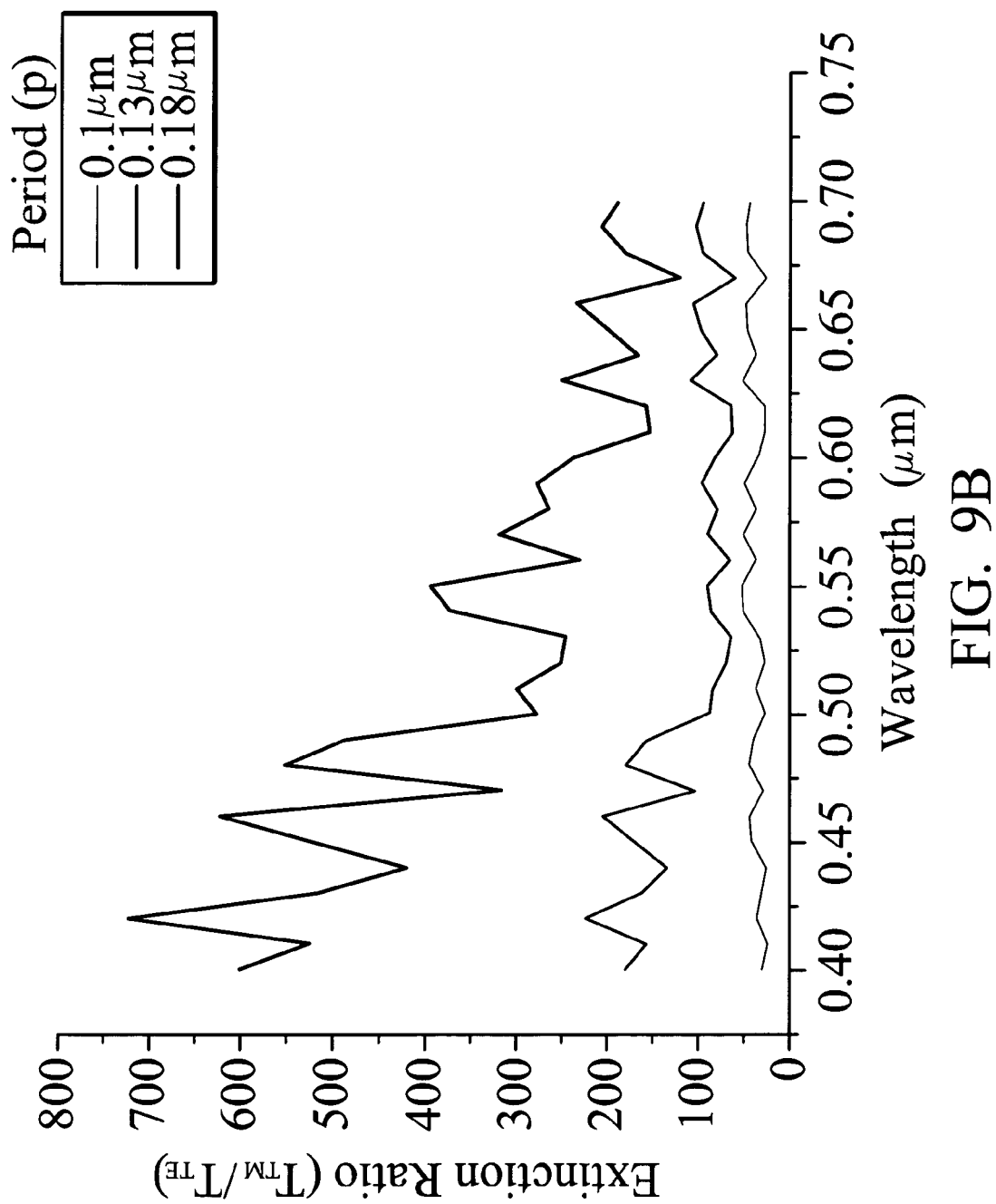
FIG. 9B is a graphical plot showing the relationship between wavelength and extinction ratio of the sixth test of the wire grid polarizer according the conventional technology.

FIGS. 6A, 6B, 7A, 7B, 8A and 8B show the calculated relationship between the wavelength of the incident beam and the reflectance (R) efficiency and the transmittance (T) efficiency for TE or TM polarized light of the wire grid polarizers. FIGS. 9A and 9B show the calculated relationship between the wavelength of the incident beam and the extinction ratio ($T_{TM}/T_{TE}$) of the wire grid polarizers. These relationships are calculated using the Gsolver grating analysis software tool commercially available from Grating Solver Development Company. The inventor provides the following tests to analyze the wire grid polarizer of the present invention.

Figure 6A:
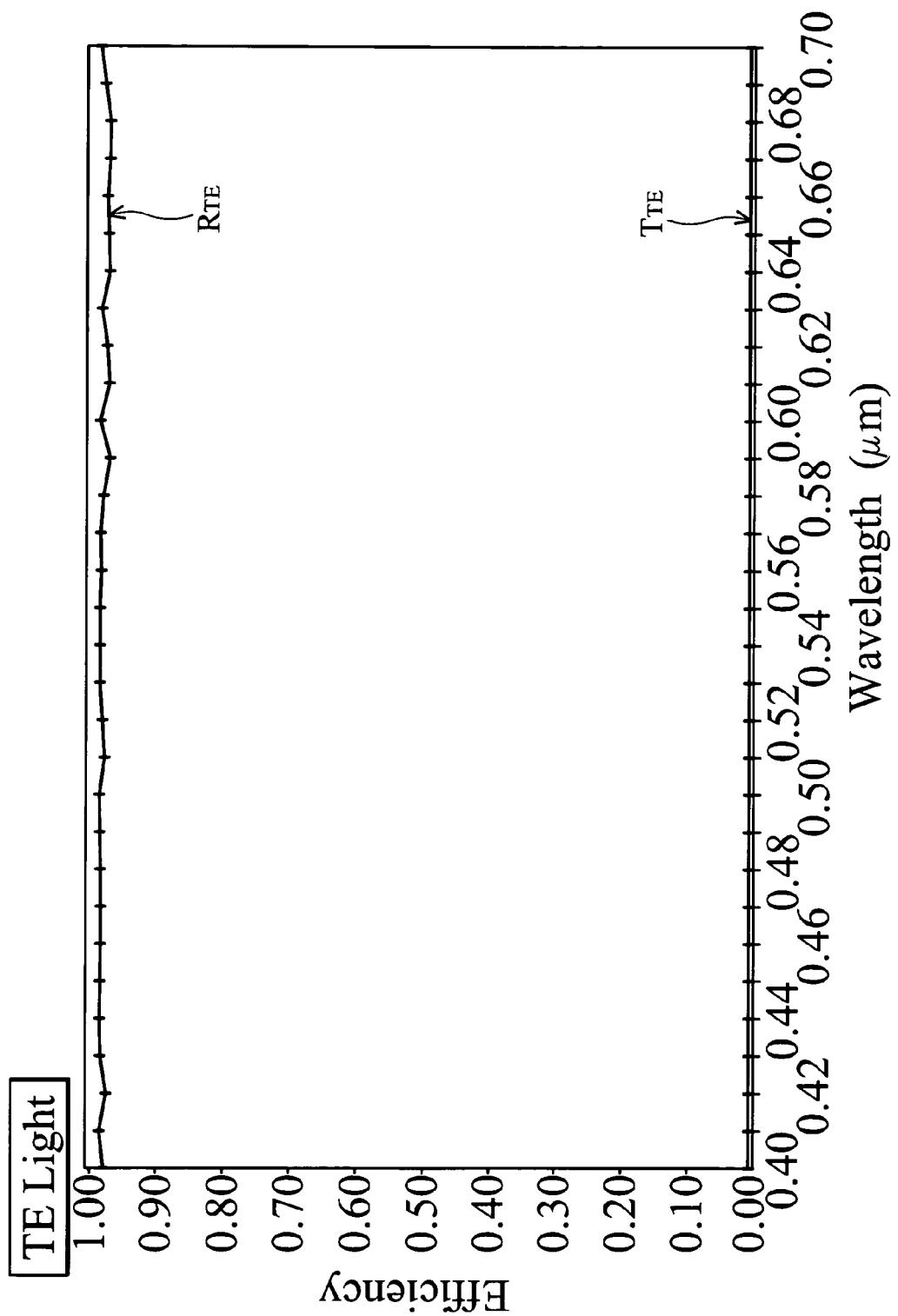
FIG. 6A is a graphical plot showing the relationship between wavelength and reflectance ($R_{TE}$) and transmittance ($T_{TE}$) for TE polarized light of the first test of the wire grid polarizer according to the present invention.
Figure 6B:
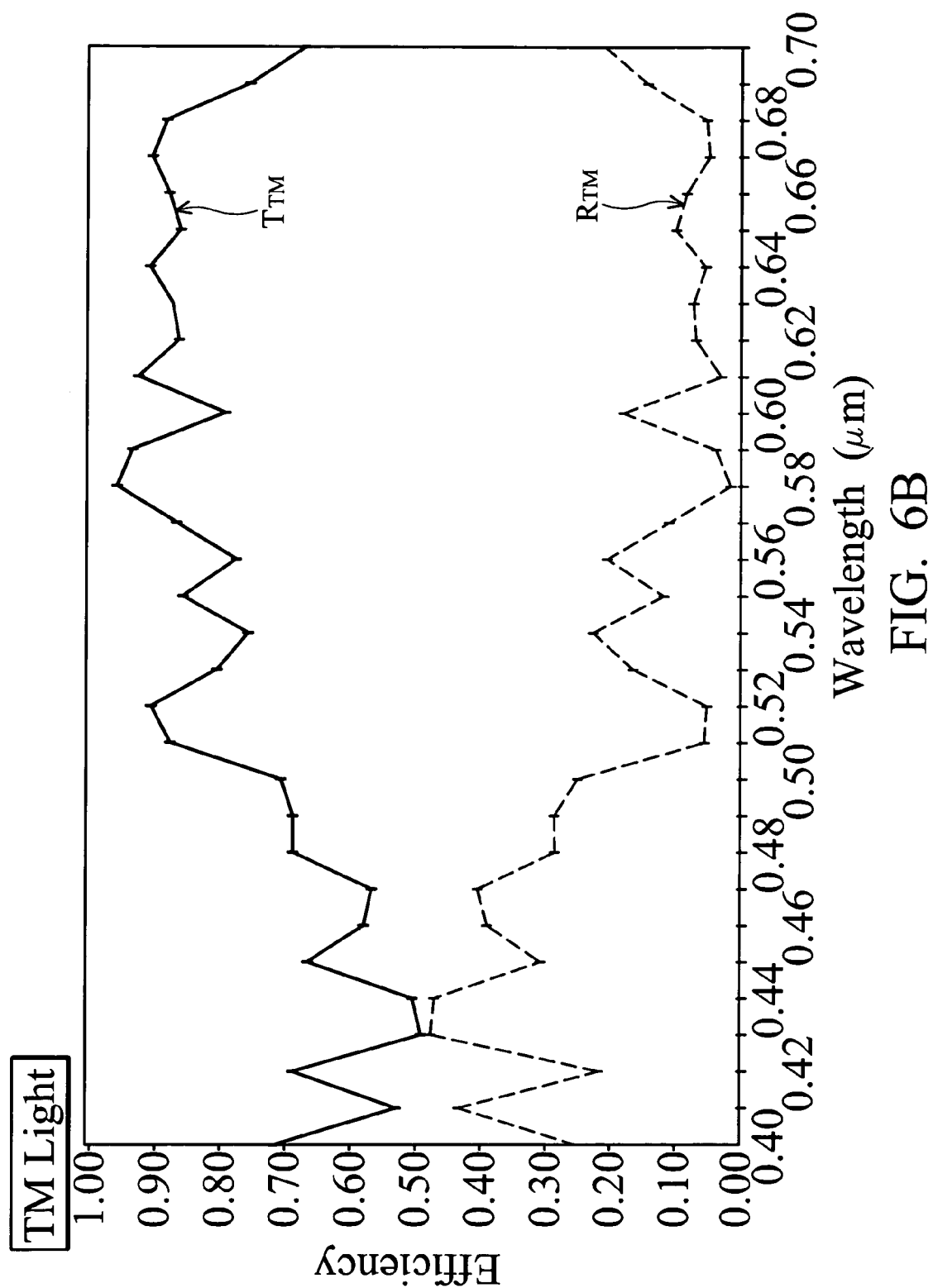
FIG. 6B is a graphical plot showing the relationship between wavelength and reflectance ($R_{TM}$) and transmittance ($T_{TM}$) for TM polarized light of the first test of the wire grid polarizer according to the present invention.

Please refer to the present wire grid polarizer 200 shown in FIG. 2. The testing parameters of the first text are as follows. The wavelength of the incident beam 270 ranges from 400 nm to 700 nm (that is, the visible spectrum). The first and second metal layers 240 and 250 are aluminum layers. The dielectric layer 220 is a PMMA layer. The substrate 210 is a glass substrate with a thickness of 1000 μm. The first thickness (d1) is 70 nm. The second thickness (d2) is 70 nm. The vertical distance (l) is 30 nm. The period (p) is 100 nm. The width (w) is 50 nm. The incident angle is 0°. FIG. 6A shows the relationship between wavelength and reflectance ($R_{TE}$) and transmittance ($T_{TE}$) for TE polarized light of the first test of the wire grid polarizer according to the present invention. FIG. 6B shows the relationship between wavelength and reflectance ($R_{TM}$) and transmittance ($T_{TM}$) for TM polarized light of the first test of the wire grid polarizer according to the present invention.

As shown in FIGS. 6A and 6B, the efficiency of $T_{TM}$ is greater than 70% over the visible spectrum from 0.5 μm. In addition, the efficiency of $T_{TE}$ is nearly zero (in fact, it is about 1E-4). Thus, the calculated extinction ratio ($T_{TM}/T_{TE}$) of the present polarizer 200 at wavelengths of 470 nm, 550 nm and 610 nm is about 6.75E4~2.07E5. Accordingly, the first test verifies that the wire grid polarizer of the present invention provides a very high extinction ratio (>1000), thereby increasing polarization.

Please refer to the present wire grid polarizer 200 shown in FIG. 2. The testing parameters of the second test are as follows. The wavelengths of the incident beam 270 are set at 470 nm, 550 nm and 610 nm. The first and second metal layers 240 and 250 are aluminum layers. The dielectric layer 220 is a PMMA layer. The substrate 210 is a glass substrate with a thickness of 1000 μm. The first thickness (d1) is 70 nm. The second thickness (d2) is 70 nm. The vertical distance (l) is 30 nm. The period (p) is 100 nm. The width (w) is 50 nm. The incident angles θ are set at 0°, 45° and 80°. The inventor provides test results (Table 1) showing the relationship between the incident angles θ and the extinction ratio ($T_{TM}/T_{TE}$) of the present polarizer at wavelengths of 470 nm, 550 nm and 610 nm.

TABLE 1

| Incident angle θ | Wavelength λ | | |
|---|---|---|---|
| | 470 nm | 550 nm | 610 nm |
| 0° | 6.75E4 | 2.07E5 | 1.61E5 |
| 45° | 1.04E5 | 1.77E5 | 2.34E5 |
| 80° | 5.04E4 | 2.61E6 | 3.64E6 |

Accordingly, the second test verifies that the wire grid polarizer of the present invention still provides a very high extinction ratio (>1000) at incident angle of 80°, thereby broadening its applications.

Please refer to the present wire grid polarizer 200 shown in FIG. 2. The testing parameters of the third test are as follows. The wavelength of the incident beam 270 ranges from 400 nm to 700 nm (that is, the visible spectrum). The first and second metal layers 240 and 250 are aluminum layers. The dielectric layer 220 is a PMMA layer. The substrate 210 is a glass substrate with a thickness of 1000 μm. The first thickness (d1) is 70 nm. The second thickness (d2) is 70 nm. The vertical distance (l) is 30 nm. The period (p) is 180 nm. The width (w) is 90 nm. The incident angle is 0°. FIG. 7A shows the relationship between wavelength and reflectance ($R_{TE}$) and transmittance ($T_{TE}$) for TE polarized light of the third test of the wire grid polarizer according to the present invention. FIG. 7B shows the relationship between wavelength and reflectance ($R_{TM}$) and transmittance ($T_{TM}$) for TM polarized light of the third test of the wire grid polarizer according to the present invention.

As shown in FIGS. 7A and 7B, the efficiency of $T_{TM}$ is greater than 70% over the visible spectrum from 0.5 μm. In addition, the efficiency of $T_{TE}$ is nearly zero (in fact, it is about 1E-4). Thus, the calculated extinction ratio ($T_{TM}/T_{TE}$) of the present polarizer 200 at wavelengths of 470 nm, 550 nm and 610 nm is about 1E2~3.93E5. Accordingly, the third test verifies that the wire grid polarizer of the present invention provides a high extinction ratio, thereby increasing polarization.

Please refer to the present wire grid polarizer 200 shown in FIG. 2. The testing parameters of the fourth test are as follows. The wavelength of the incident beam 270 ranges from 400 nm to 700 nm (the visible spectrum). The first and second metal layers 240 and 250 are aluminum layers. The dielectric layer 220 is a PMMA layer. The substrate 210 is a glass substrate with a thickness of 100 μm. The first thickness (d1) is 70 nm. The second thickness (d2) is 70 nm. The vertical distance (l) is 130 nm. The period (p) is 100 nm. The width (w) is 50 nm. The incident angle is 0°. FIG. 8A shows the relationship between wavelength and reflectance ($R_{TE}$) and transmittance ($T_{TE}$) for TE polarized light of the comparable test of the wire grid polarizer according to the present invention. FIG. 8B shows the relationship between wavelength and reflectance ($R_{TM}$) and transmittance ($T_{TM}$) for TM polarized light of the comparable test of the wire grid polarizer according to the present invention.

As shown in FIGS. 8A and 8B, since the vertical distance (l) is greater than 100 nm, the efficiency of $T_{TM}$ is almost lower than 50% over the visible spectrum. In addition, the efficiency of $T_{TE}$ has resonance at wavelength of 0.45 μm. Thus, the calculated extinction ratio ($T_{TM}/T_{TE}$) of the polarizer at the wavelength of 450 nm is only 28.6. Thus it does not meet the requirements of the polarizer with high extinction.

Please refer to the present wire grid polarizers 200 and 300 shown in FIGS. 2 and 3. In the fifth test, the inventor uses the same parameters used in the first test to investigate the relationship between the remaining dielectric layer 320' and the extinction ratio of the present polarizer 300. The inventor finds that, when the thickness (t) of the remaining dielectric layer 320' is within 500 nm, the extinction ratio is not affected. That is, although the thickness (t) is 500 nm, the extinction ratio ($T_{TM}/T_{TE}$) of the present polarizer 300 still provides a high extinction ratio (>1000).

Figure 1:
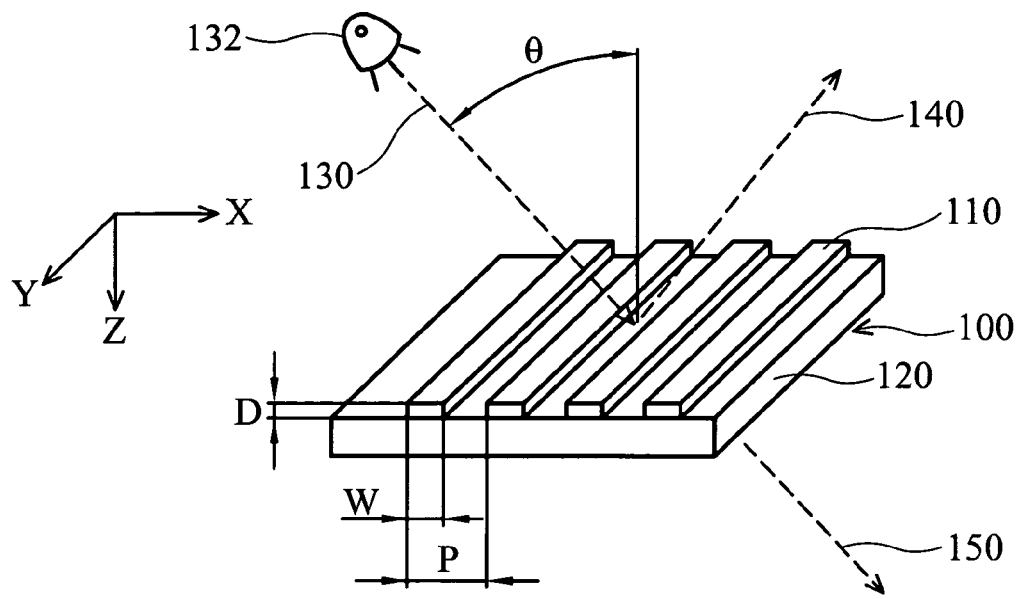
FIG. 1 is a perspective view of a conventional wire grid polarizer.

Please refer to the conventional wire grid polarizer 100 with single metal layer 110 shown in FIG. 1 and the present wire grid polarizer 200 with double metal layers 240 and 250 shown in FIG. 2. The testing parameters of the sixth test are as follows. The wavelength of the incident beams 130 and 270 range from 400 nm to 700 nm (that is, the visible spectrum). The metal layers 110, 240 and 250 are aluminum layers. The dielectric layer 220 is a PMMA layer. The substrates 120 and 210 are glass substrates. Each glass substrate 120/210 has a thickness of 1000 μm. The thickness (D) of the conductors 110 is 70 nm. The first thickness (d1) of the first metal layer 240 is 70 nm. The second thickness (d2) of the second metal layer 250 is 70 nm. The vertical distance (l) between the first and second metal layers is 130 nm. The periods (P) of the conductors 110 are set at 100 nm, 130 nm and 180 nm. The periods (p) of the dielectric layers 220 are set at 100 nm, 130 nm and 180 nm. Each conductor 110 has a width (W) of 50 nm. Each dielectric layer 220 has a width (w) of 50 nm. The incident angle (θ) is 0°. Data calculated under the above parameters is shown in FIGS. 9A and 9B. FIG. 9A shows the relationship between wavelength and extinction ratio of the present wire grid polarizer 200 shown in FIG. 2. FIG. 9B shows the relationship between wavelength and extinction ratio of the conventional wire grid polarizer 100 shown in FIG. 1.

As shown in FIGS. 9A and 9B, at different periods of 100 nm, 130 nm and 180 nm, the extinction ratio ($T_{TM}/T_{TE}$) of the present polarizer 200 is much greater than that of the conventional polarizer 100.

Thus, the present invention provides an optimal design for a wire grid polarizer with double metal layers. Additionally, the present invention provides two examples of forming such polarizer. The present wire grid polarizer has a period of 10~250 nm, a first or second thickness of 30~150 nm, and a vertical distance of 10~100 nm. In addition, the ratio of the width to the period is 25~75%. Thus, the polarizer can reduce resonance to achieve a high extinction ratio (>1000) for the visible spectrum. Moreover, the polarizer can maintain a high extinction ratio for use at wide incident angles (0˜80°), and is thereby well suited to LCD applications and ameliorates the disadvantages of the conventional technology.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A transmissive wire grid, full spectrum polarizer with double metal layers for use in visible spectrum, comprising:
    a transparent substrate;
    an array of parallel and elongated dielectric protrusions formed on the transparent substrate, wherein the dielectric protrusions have a period and a trench is located between adjacent dielectric protrusions;
    a first metal layer having a first thickness formed in the trench; and
    a second metal layer having a second thickness and a width formed on each dielectric protrusion, wherein the first and second metal layers are separated by a vertical distance;
    wherein the period is not greater than 180 nm;
    wherein the first thickness is not greater than 150 nm and is equal to the second thickness;
    wherein the vertical distance is not greater than 100 nm;
    wherein the ratio of the width to the period is in a range of 25~75%, and
    wherein the full spectrum polarizer has an extinction ratio of transmittance ($T_{TM}/T_{TE}$) of about 1E2-3.93E5 at wavelengths between 470–610 nm, where $T_{TM}$ is the transmittance of the TM polarized light and $T_{TE}$ is the transmittance of the TE polarized light.

2. The wire grid polarizer according to claim 1, wherein the transparent substrate is exposed in the trench.

3. The wire grid polarizer according to claim 1, wherein a remaining dielectric layer is formed on a bottom of the trench.

4. The wire grid polarizer according to claim 1, wherein a thickness of the transparent substrate is 50–1500 μm.

5. The wire grid polarizer according to claim 4, wherein the transparent substrate is a glass or plastic substrate.

6. The wire grid polarizer according to claim 1, wherein the dielectric layers are PMMA (polymethyl methacrylate) layers.

7. The wire grid polarizer according to claim 1, wherein the first metal layer is an Au, Ag, Cu or Al layer.

8. The wire grid polarizer according to claim 1, wherein the second metal layer is an Au, Ag, Cu or Al layer.

9. The wire grid polarizer according to claim 1, wherein the first and second metal layers comprise the same material.

10. The wire grid polarizer according to claim 1, farther comprising:
    a protective layer formed on the first and second metal layers.

11. The wire grid polarizer according to claim 10, wherein the protective layer is a $SiO_2$, SiN or SiON layer.

12. The wire grid polarizer according to claim 1, wherein the period is in a range of 120–180 nm.

13. The wire grid polarizer according to claim 1, wherein the first or second thickness is in a range of 30~150 nm.

14. The wire grid polarizer according to claim 1, wherein the vertical distance is in a range of 10~100 nm.

15. The wire grid polarizer according to claim 1, wherein the full spectrum polarizer has a transmittance $T_{TM}$ not less than 70% over visible spectrum from 0.5 μm.

16. The wire grid polarizer according to claim 1, wherein each of the first metal layer and the second metal layer are formed of a single metal material.

17. A transmissive wire grid, full spectrum polarizer with double metal layers for use in visible spectrum, comprising:
    a transparent substrate;
    an array of parallel and elongated dielectric protrusions formed on the transparent substrate, wherein the dielectric protrusions have a period and a trench is located between adjacent dielectric protrusions;
    a first metal layer having a first thickness formed in the trench; and
    a second metal layer having a second thickness and a width formed on each of the dielectric protrusions, wherein a vertical distance is between the first and second metal layers;
    wherein the period is in a range of 10~180 nm;
    wherein the first thickness is in a range of 30~150 nm and is equal to the second thickness;
    wherein the vertical distance is in a range of 10~100 nm;
    wherein the ratio of the width to the period is in a range of 25~75%, and
    wherein the full spectrum polarizer has an extinction ratio of transmittance ($T_{TM}/T_{TE}$) of about 1E2-3.93E5 at wavelengths between 470–160 nm, where $T_{TM}$ is the transmittance of the TM polarized light and $T_{TE}$ is the transmittance of the TE polarized light.

18. The wire grid polarizer according to claim 17, wherein the transparent substrate is exposed in the trench.

19. The wire grid polarizer according to claim 17, wherein a remaining dielectric layer is formed on a bottom of the trench.

20. The wire grid polarizer according to claim 17, wherein the full spectrum polarizer has a transmittance $T_{TM}$ not less than 70% over visible spectrum from 0.5 μm.

21. The wire grid polarizer according to claim 17, wherein each of the first metal layer and the second metal layer are formed of a single metal material.

22. A method of forming a transmissive wire grid, full spectrum polarizer with double metal layers for use in visible spectrum, comprising the steps of:
    providing a transparent substrate;
    forming an array of parallel and elongated dielectric protrusions on the transparent substrate, wherein the dielectric protrusions have a period and a trench is located between adjacent dielectric protrusions;
    forming a first metal layer having a first thickness in the trench; and
    forming a second metal layer having a second thickness and a width on each dielectric protrusion, wherein the first and second metal layers are separated by a vertical distance;
    wherein the period is in a range of 1~180 nm;
    wherein the first thickness is in a range of 30~150 nm and is equal to the second thickness;
    wherein the vertical distance is in a range of 10~100 nm;
    wherein the ratio of the width to the period is in a range of 25~75%, and wherein the full spectrum polarizer has an extinction ratio of transmittance ($T_{TM}/T_{TE}$) of about 1E2–3.93E5 at wavelengths between 470–160 nm, where $T_{TM}$ is the transmittance of the TM polarized light and $T_{TE}$ is the transmittance of the TE polarized light.

23. The method according to claim 22, the transparent substrate is exposed in the trench.

24. The method according to claim 22, wherein a remaining dielectric layer is formed on a bottom of the trench.

25. The method according to claim 22, further comprising the step of: forming a protective layer on the first and second metal layers.

26. The method according to claim 22, wherein the dielectric layers are formed by photolithography or nanoimprint.

27. The method according to claim 22, wherein the full spectrum polarizer has a transmittance $T_{TM}$ not less than 70% over visible spectrum from 0.5 μm.

28. The method according to claim 22, wherein each of the first metal layer and the second metal layer are formed of a single metal material.

* * * * *